United States Patent Office 3,293,298
Patented Dec. 20, 1966

3,293,298
HYDROGENATION PROCESS FOR THE PREPARATION OF PRIMARY AMINES
Dennis Szabo, Villeneuve-la-Garenne, France, assignor to Emery Industries, Inc., Cincinnati, Ohio, a corporation of Ohio
No Drawing. Filed July 17, 1963, Ser. No. 295,800
Claims priority, application Great Britain, July 18, 1962, 27,667/62
6 Claims. (Cl. 260—583)

This invention relates to a hydrogenation process for the preparation of primary amines.

Primary amines, certain of which are of commercial value as raw materials for the preparation of synthetic detergents, can be obtained by hydrogenation of the corresponding nitriles in the liquid phase, in the presence of a catalyst, such as nickel, which may be carried on a support material such as silica. A disadvantage of this process is that the yields of primary amines tend to be rather low, secondary amines being formed in substantial proportions.

It has now been found that the primary amines can be obtained in improved yield by carrying out the hydrogenation process in the presence of a polar solid adsorbent.

By using the term "polar" in this connection, we mean a solid adsorbent, such as alumina, whose interatomic bonds are appreciably ionic in character by contrast with those—charcoal for instance—whose interatomic bonds are essentially covalent.

The polar solid adsorbent used according to the process of the invention is not per se a catalyst for the hydrogenation reaction: its beneficial effect appears to be connected with its ability to adsorb those by-products of hydrogenation which would otherwise poison the hydrogenation catalyst proper and would thus decrease the rate of the reaction leading to primary amine formation.

The preferred adsorbent is or contains alumina, and is preferably an alumina that has been obtained by precipitation, and dried at a temperature below about 150° C.

The amount of adsorbent employed suitably forms from 1 to 10%, preferably from 3 to 6%, by weight of the nitrile to be hydrogenated.

The process has particular application to the hydrogenation of the nitriles of fatty acids, particularly those containing from 8 to 22 carbon atoms in the molecule, such as those derived from higher fatty acids present in oils and fats, for example lauric and stearic nitriles.

The hydrogenation can, if desired, be carried out under a partial pressure of ammonia. This, too, has the effect of suppressing the formation of secondary amines.

The following examples illustrate how the invention can be applied to hydrogenation processes carried out at temperatures in the range 120 to 150° C., under hydrogen pressures of 5 to 25 atmospheres.

Example 1

In this and the following examples, the hydrogenation vessel employed was an electrically heated stainless steel autoclave of capacity 170 ml., equipped with means for agitating the liquid phase contained therein and with means for introducing gaseous reactants. In all cases, the nitrile employed was of low free fatty acid content (below 0.05% by weight).

Lauronitrile was successively treated with and without adsorbent, with hydrogen under a pressure of 10 atmospheres, at a temperature of 140° C., for 40 minutes. The hydrogenation catalyst employed was a conventional nickel-on-silica one. In the first procedure alumina of the grade commercially supplied for use in chromatographic processes was employed as adsorbent, in an amount forming 5% by weight of the nitrile. The yield of primary amines was 87.5%, no secondary amines being formed. In the second procedure, in which no adsorbent was used, the yield of primary amines was 72%, with 27% of secondary amines.

Example 2

Under the temperature and pressure conditions given in Example 1, and with the nickel-on-silica catalyst present in an amount forming 2% by weight of the nitrile, lauronitrile was hydrogenated successively (a) Without the alumina,
(b) With an amount of alumina forming 2% by weight of nitrile,
(c) With an amount of alumina forming 5% by weight of nitrile.

Treatment times were 30, 30 and 40 minutes respectively.

Results were:

|     | Yield of Primary Amines, percent | Yield of Secondary Amines, percent |
|-----|----------------------------------|------------------------------------|
| (a) | 74.2                             | 22.2                               |
| (b) | 87.5                             | 8.7                                |
| (c) | 88.7                             | 5.4                                |

Example 3

Under temperature and pressure conditions as in the preceding examples, and with Raney nickel catalyst in an amount forming 0.4% by weight of the nitrile, lauronitrile was successively hydrogenated (a) with no adsorbent, and (b) with an alumina adsorbent in an amount forming 5% by weight of the nitrile. Treatment times were 40 and 47 minutes respectively.

In the first procedure (in which no adsorbent was used), the yield of primary amines was 54.3%. In the second procedure, the yield of primary amines was 80.5%.

Example 4

Under temperature and pressure conditions as in the preceding examples, and with Raney nickel catalyst in an amount forming 1% by weight of the nitrile, lauronitrile was successively hydrogenated in the presence of the following adsorbents:

(a) The alumina of Example 1;
(b) An alumina obtained by precipitation, in the presence of alcohol, from a solution of sodium aluminate, using nitric acid as precipitant, the precipitate being dried at 120° C.
(c) An alumina obtained as in (b) but using formic acid as precipitant.

Results were:

|       | Proportion of adsorbent to nitrile, percent | Time of Treatment under hydrogenation conditions, minutes | Yield, Percent Primary Amines | Yield, Percent Secondary Amines |
|-------|---------------------------------------------|-----------------------------------------------------------|-------------------------------|----------------------------------|
| (a)   | 5                                           | 45                                                        | 87                            |                                  |
| (b)   | 5                                           | 45                                                        | 93.5                          |                                  |
| (b)₂  | 1                                           | 45                                                        | 85.8                          | 8.5                              |
| (c)   | 1                                           | 40                                                        | 89.0                          |                                  |

Example 5

Stearonitrile was treated with hydrogen (partial pressure, 10 atmospheres) and ammonia (partial pressure, 4 atmospheres), at a temperature of 140° C., for 110 minutes, using Raney nickel catalyst in an amount forming 1% by weight of the nitrile, in the presence as adsorbent of a synthetic alumina-silica composite (13% alumina, 87% silica).

The yield of primary amine was 93.5%. No secondary amine was obtained.

Example 6

Sebaconitrile was treated under the conditions and with the results shown below, using a conventional nickel-on-silica hydrogenation catalyst, in the presence of the alumina of Example 1.

| Time of Exposure to hydrogenation conditions | Temp., °C. | Hydrogen Pressure, atm. | Ammonia Pressure, atm. | Yield of Primary Diamine, Percent | Yield of Secondary Amine, Percent |
|---|---|---|---|---|---|
| 70 minutes | 150 | 20 | | 81.5 | 13.5 |
| 55 minutes | 140 | 15 | 5 | 86.0 | 11.8 |

The embodiments of the invention in which an exclusive property or privilege is claimed are defined as follows:

1. A process for preparing primary fatty amines containing from 8 to 22 carbon atoms, which comprises hydrogenating the corresponding nitrile in the presence of a nickel hydrogenation catalyst and 1–10% by weight of the nitrile of an alumina-containing polar adsorbent, the reaction being conducted at a temperature not substantially in excess of 150° C.

2. The process of claim 1 wherein the polar adsorbent is activated alumina obtained by precipitation from solution and drying at a temperature below about 150° C., said alumina being present in an amount of from 3 to 6%, calculated on the nitrile.

3. The process of claim 2 wherein the hydrogenation catalyst is Raney nickel.

4. The process of claim 2 wherein the hydrogenation catalyst is nickel on silica.

5. A process for preparing primary fatty amines containing from 8 to 22 carbon atoms, which comprises hydrogenating the corresponding nitrile in the presence of ammonia, together with a nickel hydrogenation catalyst and 1–10% by weight of the nitrile of an alumina-containing polar adsorbent, said hydrogenation being effected at reaction temperatures between about 120° and 150° C.

6. The process of claim 5 wherein the starting material is a dinitrile containing from 8 to 22 carbon atoms which is hydrogenated to the corresponding diamine, and wherein the reaction is conducted at a partial hydrogen pressure of from about 15 to 20 atm. and at a partial ammonia pressure of from about 3 to 5 atm.

References Cited by the Examiner

UNITED STATES PATENTS 2,166,152   7/1939   Hawk _____ 260—583

FOREIGN PATENTS 421,718   12/1934   Great Britain.

OTHER REFERENCES

Schwoegler et al.: "J. Am. Chem. Soc.," 61, p. 3501.

CHARLES B. PARKER, *Primary Examiner.*

A. H. SUTTO, R. L. RAYMOND, *Assistant Examiners.*